United States Patent [19]

Schwenkel

[11] Patent Number: 4,669,740
[45] Date of Patent: Jun. 2, 1987

[54] CYLINDER HEAD GASKET

[75] Inventor: Willi Schwenkel, Hülben, Fed. Rep. of Germany

[73] Assignee: Elring Dichtungswerke GmbH, Fellbach, Fed. Rep. of Germany

[21] Appl. No.: 903,020

[22] Filed: Sep. 2, 1986

[30] Foreign Application Priority Data

Sep. 19, 1985 [DE] Fed. Rep. of Germany ....... 3533359

[51] Int. Cl.⁴ .............................................. F16J 15/12
[52] U.S. Cl. ................. 277/235 B; 277/166; 277/232
[58] Field of Search ................. 277/166, 231–234, 277/235 R, 235 B

[56] References Cited

U.S. PATENT DOCUMENTS

| 3,567,234 | 3/1971 | Syrycki | 277/235 B |
| 3,784,212 | 1/1974 | Doerfling | 277/235 B |
| 4,083,570 | 4/1978 | Sugawara | 277/235 B |
| 4,330,585 | 5/1982 | Eyrard et al. | 277/235 B |
| 4,468,044 | 8/1984 | Ulmer et al. | 277/166 |

FOREIGN PATENT DOCUMENTS 6604941 3/1970 Fed. Rep. of Germany .

Primary Examiner—Robert S. Ward
Attorney, Agent, or Firm—Pahl, Lorusso & Loud

[57] ABSTRACT

Cylinder head for gasket comprising a gasket plate having at least two combustion chamber apertures separated from one another by a web of a gasket plate, also comprising sheet metal combustion chamber edge trims approximately C-shaped in cross section and having flanges extending approximately parallel to the plane of the gasket plate and overlapping the edge regions of the combustion chamber apertures, the flanges of the combustion chamber edge trims overlapping one another in the region of the web, at least on one side of the gasket plate, in order to increase the sealing surface pressure in the web region and so one flange forms a sheet metal shim.

3 Claims, 10 Drawing Figures

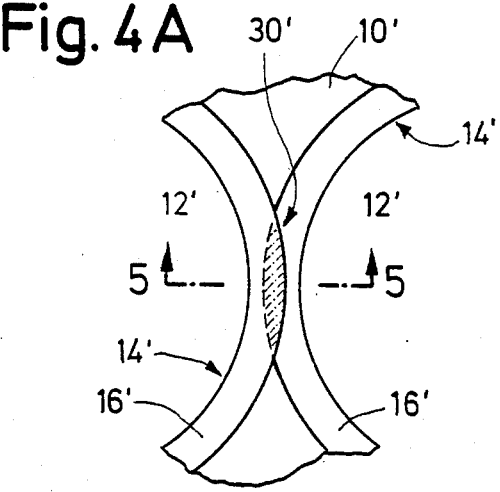
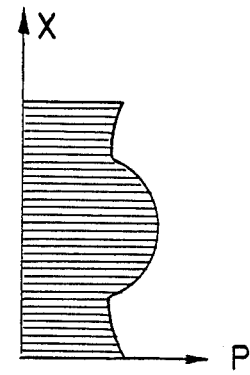
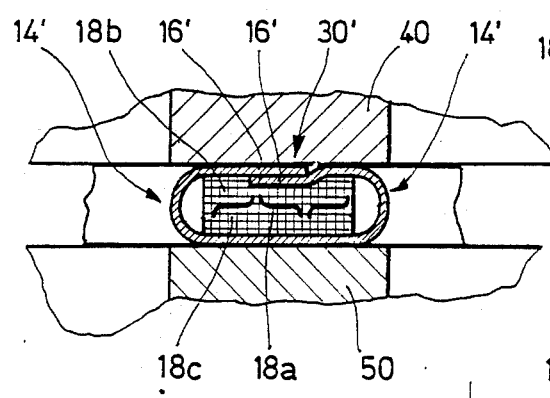
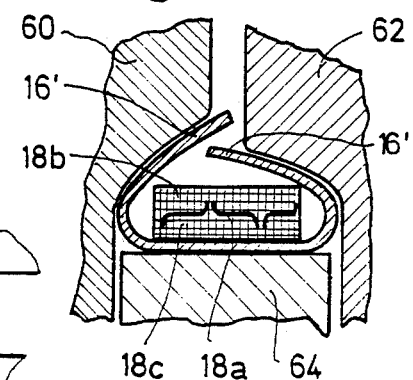
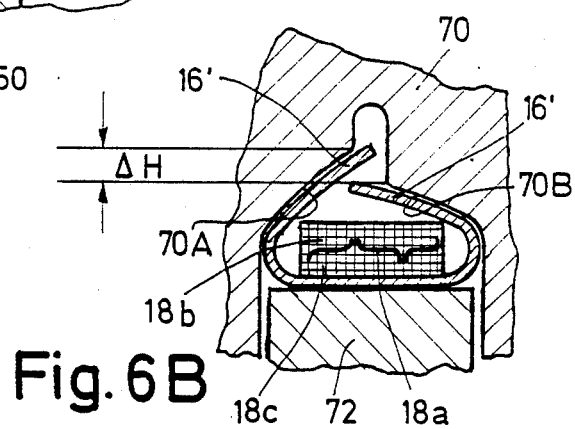

CYLINDER HEAD GASKET

The invention relates to a cylinder head gasket comprising a gasket plate having at least two combustion chamber apertures separated from one another by a web of the gasket plate, also comprising sheet metal combustion chamber edge trims approximately C-shaped or L-shaped in cross section and having flanges extending approximately parallel to the plane of the gasket plate and overlapping the edge regions of the combustion chamber apertures, a sheet metal shim integrally formed with a combustion chamber edge trim and overlapped by a flange hereby being supported at least on one side of the gasket plate to increase sealing surface pressure in the web region.

In the case of cylinder head gaskets having combustion chamber apertures arranged very close to one another, the webs located between these apertures are particularly critical areas with regard to sealing as the sealing surface pressure in these areas is possibly insufficient to ensure the necessary gas seal between the combustion chambers. Cylinder head gaskets are therefore known, which have sheet metal shims or underlayers secured on one or both sides of the gasket plate in the region of the webs between closely arranged combustion chamber apertures in order to give these sealing areas, which are particularly at risk, a greater resistance to deformation and to effect an increase in sealing surface pressure in these areas.

The known sheet metal shims for the web regions between the combustion chamber apertures do, however, have a great number of disadvantages. These will be explained in greater detail on the basis of, for example, EP-B No. 1-0028 576.

In the case of this known cylinder head gasket, one side of the gasket plate is covered with a narrow sheet metal strip, the longitudinal center line of which runs through the centers of the combustion chamber apertures. Sheet metal shims then result in the web regions on both sides of the gasket plate due to punching out and folding over of the sheet metal strip. These shims have the shape of a narrow rectangle. The longitudinal sides of the rectangle adjacent the combustion chamber apertures are not formed by straight lines but by arcs of a circle. The narrow sides of the sheet metal shims therefore extend parallel to the longitudinal center line connecting the centers of the combustion chamber apertures with one another and the narrowest point of each sheet metal shim is located on this longitudinal center line. Consequently, these known sheet metal shims effect their smallest increase in sealing surface pressure just at the point where the two adjacent combustion chambers are closest to one another. At the same time, the steps created by the narrow sides of the sheet metal shims create the risk of gas overflowing along these steps. The place where the increase in sealing surface pressure effected by the sheet metal shims is in any case the least, i.e. in the central region of the webs separating the combustion chamber apertures from one another, is also the place where the temperature load on the cylinder head gasket is the greatest (worst cooling). Consequently, the so-called soft material layers of customary cylinder head gaskets also settle the most at the same place and this further increases the risk of gas overflowing. Finally, the regions of such a sheet metal shim which are located on either side of the narrowest central region have a larger surface area than the latter. They therefore cause a release of pressure on this central region and, consequently, the risk of an inadequate gas seal is again increased.

The known sheet metal shims also necessitate additional material and increase the cost of production as the sheet metal shims have to be mounted on the gasket plate prior to assembly of the combustion chamber edge trims. Sheet metal shims produced and mounted as individual pieces do, however, cause even greater difficulties than the known cylinder head gasket of EP-B No. 1-0028 576. In this case, the individual sheet metal shims, which are mostly very small, are difficult to handle and secure to the gasket plate which often results in rejects due to displaced, missing or duplicated sheet metal shims.

Most of the disadvantages described above also apply for the sheet metal shims disclosed in German published application DE-AS No. 2 228 155. In the case of the cylinder head gasket known from this publication, the combustion chamber edge trims of adjacent combustion chamber apertures are joined together by a sheet metal web to form one piece on one side of the gasket plate. Two punched tongues or lugs project transversely from this sheet metal web. During assembly, these tongues are bent backwards through 180° onto the sheet metal web and each thus forms a sheet metal shim. This known construction also results in the unfavorable distribution of sealing surface pressure described above. The construction also requires additional material and its assembly is very complicated. With this principle of suspending the sheet metal shims from the sheet metal web connecting the combustion chamber apertures it is not possible to provide sheet metal shims on the side of the gasket plate remote from the sheet metal web connecting the combustion chamber edge trims.

The object underlying the invention was to provide a cylinder head gasket which is simple to produce and with which the web areas between the combustion chamber apertures display a good reinforcing effect even when the apertures are close together.

Proceeding on the basis of a cylinder head gasket of the type described at the beginning and disclosed, for example, in DE-AS No. 2 228 155, this object may be accomplished in accordance with the invention in that the flanges of the combustion chamber edge trims overlap one another in the web region at least on one side of the gasket plate such that one flange forms the sheet metal shim. The inventive solution does not necessitate either additional material or an additional working step during production of the cylinder head gasket. On the contrary, an optimum distribution of pressure is obtained in the web region in an amazingly simple manner. In contrast to the known constructions described above, the inventive sheet metal shim, which is formed by one of the flanges, is in fact at its widest at the narrowest point of the gasket plate web located between two combustion chamber apertures. In addition, no limitation of the sheet metal shim extends in the direction of the longitudinal center line of the cylinder head gasket, i.e. in the direction of any possible gas overflow, and this avoids any step extending in this direction. When the gasket is installed and the cylinder head tightened, the overlap of adjacent combustion chamber edge trims also results in a frictional connection between the flanges of the combustion chamber edge trims which are pressed together and, consequently, in an increased stability of the cylinder head gasket. The inventive overlap may also be provided both on the side of the gasket plate, from which the combustion chamber edge trims are mounted, and on the side, on which the webs of the edge trims penetrating the combustion chamber apertures of the gasket plate are bent over to form the second flange. In this case, the width of the overlap may vary on either side of the gasket plate. Displaced, forgotten or duplicated sheet metal shims are not possible in principle with the inventive cylinder head gasket.

It is fundamentally possible for the area of overlap to have any desired shape by punching out the sheet metal combustion chamber edge trims accordingly. Even the conventional shape of the combustion chamber edge trims with annular flanges will result in a sheet metal shim which has an optimum shape since, in this preferred embodiment of the invention, the region of overlap of the flanges has the shape of a double circular segment extending in the longitudinal direction of the web and being at its broadest at the narrowest point of the web.

Since the overlap may also be provided on the side of the gasket plate, onto which the second flange of the combustion chamber edge trim is pressed after being bent over, the inventive solution finally allows production of a cylinder head gasket, wherein the combustion chamber edge trims are connected to one another by a connecting element to form one piece on one side of the gasket plate and, in accordance with the invention, the flanges overlap one another on the side of the gasket plate remote from the connecting element.

Additional features, advantages and details of the invention result from the following description as well as the attached drawings of a preferred embodiment of the inventive cylinder head gasket. For further explanation of the invention, the drawings also illustrate a known cylinder head gasket with a sheet metal shim. In the drawings, FIG. 1 is a plan view of a known cylinder head gasket with a sheet metal shim;

FIGS. 4A and 4B are illustrations of the inventive cylinder head gasket shown in FIG. 3, corresponding to the FIGS. 2A and 2B;

FIG. 5 is a section along line 5—5 in FIG. 4A in the assembled state of the cylinder head gasket and FIGS. 6A and 6B are schematic illustrations of two different embodiments of a tool for bending over the upper flange, according to FIG. 3, of the combustion chamber edge trims.

Figure 1:
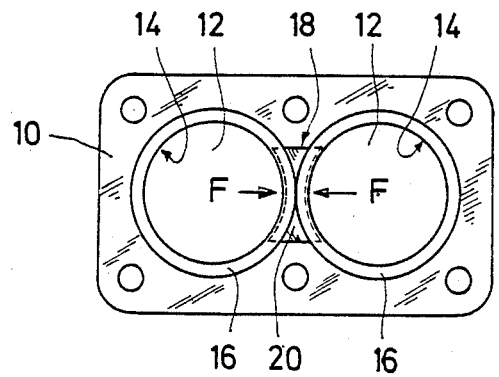

FIG. 1 illustrates a cylinder head gasket of the type used in a twin-cylinder engine. However, the application of the basic concept of the invention is not, of course, restricted to cylinder head gaskets for twin-cylinder engines. In addition, non-essential elements of the cylinder head gasket have been omitted in the explanation of the invention.

This known cylinder head gasket has a gasket plate 10 with two combustion chamber apertures 12, in the region of which the edges of the gasket plate 10 are trimmed in the known manner by sheet metal combustion chamber edge trims 14. These have a C-shaped cross section and an upper and a lower flange 16 (see FIG. 1) which are supported on the two main surfaces of the gasket plate 10 and connected with one another via a web penetrating the combustion chamber apertures 12. A web 18 of the gasket plate 10 extends between these apertures and is reinforced in a manner known per se on at least one side of the gasket plate 10 by means of a sheet metal insert or shim 20. This serves for better support of the areas of the engine block and cylinder head which enclose the web 18 between them in the assembled state of the cylinder head gasket and thereby serves to increase sealing surface pressure in the region between the two combustion chamber apertures. As clearly shown in FIGS. 1 and 2A, the sheet metal shim 20 is at its narrowest just at the place where the web 18 is also at its narrowest. At this point, the soft material layer of the gasket plate 10, which is not shown in greater detail in FIG. 1, also suffers its greatest loss of volume during operation of the engine and so the central area 20A of the sheet metal shim 20 causes the least increase in sealing surface pressure for this reason. Since, in addition, the outer regions 20B of the sheet metal shim 20 have a substantially larger surface area than the central area 20A, they have the effect of relieving pressure on the area 20A. This results in the distribution of pressure illustrated in FIG. 2B, in which the magnitude of sealing surface pressure for an assembled cylinder head gasket is plotted to the right in the direction of arrow P and the position of each respective area of the sheet metal shim 20 is plotted upwards in the direction of arrow X, starting at the lower edge of the sheet metal shim according to FIG. 2A and continuing in the direction of arrow X. FIG. 2B shows quite clearly that the known sheet metal shim 20 leads to a much slighter increase in sealing surface pressure at the point which is most critical for gas overflow than in the area of its narrow sides 20C. In addition, the narrow sides 20C of the sheet metal shim 20 form a step and therefore lead to an abrupt decrease in sealing surface pressure or rather their reinforcing or support effect in this region. Since this step extends in the direction F (see FIG. 1) in which any overflow of gas between the two combustion chambers is most likely to be expected, the known solution is also unsatisfactory for this reason.

Figure 3A:
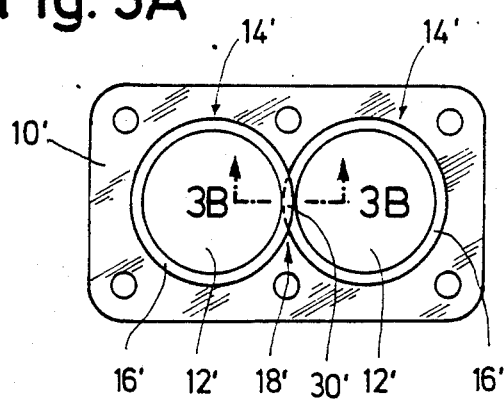
FIG. 3A is a plan view of an inventive cylinder head gasket.
Figure 3B:
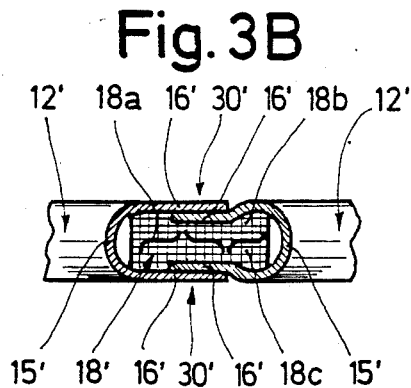
FIG. 3B is a section through this cylinder head gasket along line 3B—3B in FIG. 3A.

FIGS. 3A and 3B again show a gasket plate 10' with two combustion chamber apertures 12', between which a web 18' of the gasket plate 10' extends. FIG. 3B also shows a preferred construction of the gasket plate 10'. This comprises in a manner known per se a support sheet 18a which has prongs stamped out on both sides and is coated on both sides with a layer of soft material 18b and 18c, respectively.

In the inventive cylinder head gasket, the edge regions of the gasket plate 10' limiting the combustion chamber apertures 12' are trimmed with sheet metal combustion chamber edge trims 14', each of which, as shown in FIG. 3B, has a C-shaped cross section formed by two flanges 16' and a web 15' penetrating the relevant combustion chamber aperture 12'.

In accordance with the invention, the flanges 16' are dimensioned, at least in the region of the web and with respect to their radial extension, as a function of the narrowest part of the web 18' such that an overlap 30' occurs on both sides of the gasket plate 10'. If an overlap of the combustion chamber edge trims 14' is required only on one side of the gasket plate 10', the flanges 16' are dimensioned on the other side such that they do not overlap. This may be the case, for example, when the two combustion chamber edge trims are joined together to form one piece, namely by a sheet metal connecting web, on one side of the gasket plate, as in the known cylinder head gasket of DE-AS No. 2 228 155.

In the inventive cylinder head gasket, one flange of one sheet metal combustion chamber edge trim forms the sheet metal shim, namely the flange which is overlapped by the flange of the adjacent combustion chamber edge trim located on the same side of the gasket plate.

Figure 2A:
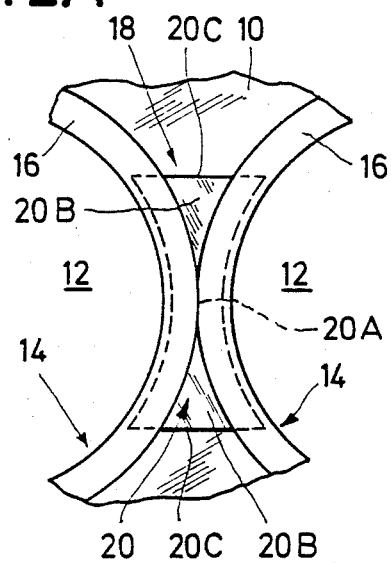
FIG. 2A is a section from FIG. 1 on an enlarged scale.
Figure 2B:
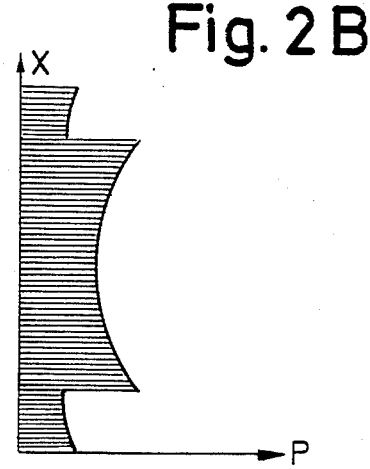
FIG. 2B shows the distribution of pressure over the sheet metal shim of FIG. 2A in the assembled or operative state of the cylinder head gasket shown in FIG. 1.

FIGS. 4A and 4B correspond to FIGS. 2A and 2B and do not, therefore, require any detailed explanation. They show that the longitudinal extension of the overlap 30' runs transversely to the direction F (see FIG. 1) of a possible gas overflow between adjacent combustion chambers and that no limitation of the overlap 30' extends in the direction F of a possible gas overflow. Moreover, FIG. 4B shows that formation of a sheet metal shim by overlapping has the advantage that the greatest support or reinforcing effect of the sheet metal shim results at the narrowest point of the web 18', i.e. in the center of the overlap 30'.

FIG. 5 shows a section along line 5—5 in FIG. 4A but through an embodiment of the type merely outlined in the above, i.e. an embodiment having an overlap 30' on only one side of the gasket plate 10' while, on the other side, the two combustion chamber edge trims 14' are joined together to form one piece. FIG. 5 also shows that the flanges 16' form a non-positive or frictional connection in the region of the overlap 30' as soon as the cylinder head gasket is installed and secured between a cylinder head 40 and an engine block 50.

Finally, production of the embodiment of the invention cylinder head gasket shown in FIG. 5 will be explained on the basis of FIGS. 6A and 6B.

FIG. 6A shows a tool having two separate press dies 60 and 62 as well as a support element 64. In two working steps, this tool first bends over the first, lower flange 16' with the aid of the first press die 62 to such an extent that, subsequently, the upper flange 16' may be bent over with the aid of the press die 60 and pressed onto the lower flange. In the variation shown in FIG. 6B, the tool has a single press die 70 and a support element 72. The press die 70 is hereby constructed in steps and has two pressing surfaces 70A and 70B. These are offset relative to one another by a distance H such that the pressing surface 70B first engages and bends over the first flange 16', which is later the lower flange, and then the other flange 16', which is later the upper flange, is engaged and bent over by the pressing surface 70A.

An overlap of the flanges is also fundamentally possible with combustion chamber edge trims which have only one single flange, i.e. an approximately L-shaped cross section. Embodiments are, however, preferred which have an upper and a lower flange, i.e. an approximately C-shaped cross section. The flanges of adjacent edge trims located on one side of the gasket plate may hereby, if required, be connected with one another by a sheet metal web to form one piece, as shown in DE-AS No. 2 228 155.

What is claimed is:

1. A cylinder head gasket comprising a gasket plate having at least two combustion chamber apertures separated from one another by a web of said gasket plate, also comprising sheet metal combustion chamber edge trims approximately C-shaped or L-shaped in cross section and having flanges extending approximately parallel to the plane of the gasket plate and overlapping the edge regions of the combustion chamber apertures, a sheet metal shim integrally formed with a combustion chamber edge trim and overlapped by a flange being supported at least on one side of the gasket plate to increase sealing surface pressure in the web region, characterized in that the flanges (16') of the combustion chamber edge trims (14') overlap one another in the web region (18') at least on one side of the gasket plate such that one flange forms the sheet metal shim.

2. Cylinder head gasket as defined in claim 1, characterized in that the region of overlap (30') of the flanges (16') has the shape of a double circular segment extending in the longitudinal direction of the web and being at its broadest at the narrowest point of the web (18').

3. Cylinder head gasket as defined in claim 1, wherein the combustion chamber edge trims are connected to one another by a connecting element to form one piece on one side of the gasket plate, characterized in that the flanges overlap one another on the side of the gasket plate remote from the connecting element.

* * * * *